United States Patent
Kumar et al.

(10) Patent No.: US 11,198,990 B2
(45) Date of Patent: Dec. 14, 2021

(54) METHOD AND A SYSTEM FOR DETERMINING A LOAD IN A WORKING MACHINE

(71) Applicant: Volvo Construction Equipment AB, Eskilstuna (SE)

(72) Inventors: Manoranjan Kumar, Växjö (SE); Lennart Skogh, Eskilstuna (SE); Torbjörn Ekevid, Landsbro (SE)

(73) Assignee: Volvo Construction Equipment AB, Eskilstuna (SE)

(*) Notice: Subject to any disclaimer, the term of this patent is extended or adjusted under 35 U.S.C. 154(b) by 0 days.

(21) Appl. No.: 16/625,273

(22) PCT Filed: Jun. 26, 2018

(86) PCT No.: PCT/EP2018/067054
§ 371 (c)(1),
(2) Date: Dec. 20, 2019

(87) PCT Pub. No.: WO2019/002258
PCT Pub. Date: Jan. 3, 2019

(65) Prior Publication Data
US 2020/0217048 A1    Jul. 9, 2020

(30) Foreign Application Priority Data
Jun. 27, 2017 (EP) ..................... 17178031

(51) Int. Cl.
*F16C 19/52* (2006.01)
*F16C 11/04* (2006.01)
(Continued)

(52) U.S. Cl.
CPC ............... *E02F 9/26* (2013.01); *E02F 9/268* (2013.01); *E02F 9/2833* (2013.01);
(Continued)

(58) Field of Classification Search
CPC .... F16C 11/045; F16C 17/246; F16C 19/522; F16C 33/105; F16C 41/00; F16C 41/008;
(Continued)

(56) References Cited

U.S. PATENT DOCUMENTS 3,522,977 A * 8/1970 Lee .................... E02F 9/006
384/322
4,175,430 A    11/1979 Morrison et al.
(Continued)

FOREIGN PATENT DOCUMENTS

CN    201214796 Y    4/2009
CN    101748760 A    6/2010
(Continued)

OTHER PUBLICATIONS

International Search Report and Written Opinion of the International Searching Authority, PCT/EP2018/067054 dated Sep. 25, 2018, 14 pages.
(Continued)

*Primary Examiner* — Marcus Charles
(74) *Attorney, Agent, or Firm* — Sage Patent Group

(57) ABSTRACT

A method for determining a load in a working machine including a linkage to be connected to an implement includes determining pressure in a first hydraulic cylinder and pressure in a second hydraulic cylinder arranged to control the linkage and determining at least one link angle between at least two links in the linkage. The method further includes, for a selected linkage bearing, determining at least two perpendicular force components acting on the selected linkage bearing, based on the determined pressure in each of the first and second cylinders and the at least one link angle; and determining a load on the selected linkage bearing as a
(Continued)

linear combination of the at least two perpendicular force components using predetermined constants for the linear combination.

16 Claims, 4 Drawing Sheets

(51) Int. Cl.
    *F16C 41/00*         (2006.01)
    *E02F 9/26*          (2006.01)
    *E02F 9/28*          (2006.01)
    *E02F 3/36*          (2006.01)
    *E02F 9/00*          (2006.01)

(52) U.S. Cl.
    CPC .......... *F16C 11/045* (2013.01); *F16C 19/522* (2013.01); *F16C 41/00* (2013.01); *E02F 3/369* (2013.01); *E02F 9/006* (2013.01)

(58) Field of Classification Search
    CPC ... E02F 9/26; E02F 9/268; E02F 9/006; E02F 9/2833; E02F 3/369
    USPC ........................ 384/448; 701/50; 37/443–444
    See application file for complete search history.

(56) References Cited

U.S. PATENT DOCUMENTS

| | | | | |
|---|---|---|---|---|
| 4,576,053 A | * | 3/1986 | Hatamura | ................ E02F 9/26 338/5 |
| 5,461,803 A | * | 10/1995 | Rocke | .................... E02F 3/437 37/443 |
| 6,052,925 A | * | 4/2000 | Reiners | .................... E02F 3/283 172/2 |
| 6,211,471 B1 | * | 4/2001 | Rocke | ................. G01G 19/083 177/136 |
| 8,504,255 B2 | * | 8/2013 | Colwell | ................. E02F 3/304 701/50 |
| 2006/0243056 A1 | | 11/2006 | Sundermeyer et al. | |
| 2009/0018718 A1 | | 1/2009 | Lang et al. | |
| 2013/0313806 A1 | * | 11/2013 | Hansen | .................... F16C 11/02 280/515 |
| 2015/0004572 A1 | | 1/2015 | Borner et al. | |
| 2015/0292179 A1 | * | 10/2015 | Joergensen | ............ E02F 3/431 701/50 |
| 2015/0315765 A1 | | 11/2015 | Alig et al. | |
| 2016/0230369 A1 | * | 8/2016 | Kaneko | .................... B60K 6/46 |
| 2016/0236704 A1 | * | 8/2016 | Enomoto | ................ B62D 3/14 |
| 2016/0290367 A1 | * | 10/2016 | Lillemets | ............... E02F 3/422 |

FOREIGN PATENT DOCUMENTS

| | | | | |
|---|---|---|---|---|
| DE | 202010006463 U1 | * | 8/2010 | ............ E02F 3/3604 |
| DE | 102009051210 A1 | * | 5/2011 | ............ E02F 9/264 |
| EP | 2886419 A2 | * | 6/2015 | ............ B62D 9/00 |
| JP | 2010196253 A | | 9/2010 | |
| JP | 2013057691 A | * | 3/2013 | ............ G01L 1/00 |
| KR | 20160112591 A | * | 9/2016 | ............ E02F 9/225 |

OTHER PUBLICATIONS

Chinese First Office Action dated Apr. 21, 2021 for Chinese Patent Application No. 201880041080.1, 14 pages (including English translation).

* cited by examiner

METHOD AND A SYSTEM FOR DETERMINING A LOAD IN A WORKING MACHINE

CROSS REFERENCE TO RELATED APPLICATIONS

This application is a 35 U.S.C. § 371 national stage application of PCT International Application No. PCT/EP2018/067054 filed on Jun. 26, 2018, which in turn claims foreign priority to European Patent Application No. 17178031.5 filed on Jun. 27, 2017, the disclosures and content of which are incorporated by reference herein in their entirety.

TECHNICAL FIELD

The invention relates to a method and a system for determining a load on a linkage bearing of a working machine.

The invention is applicable on working machines within the fields of industrial construction machines or construction equipment, in particular wheel loaders and other types of working machines comprising a linkage powered by hydraulic cylinders. Although the invention will mainly be described with respect to a wheel loader, the invention is not restricted to this particular vehicle, but may also be used in other vehicles such as excavators, backhoe loaders and the like.

BACKGROUND

Working machines such as wheel loaders and excavators are often used in a repetitive manner where the same work cycle is performed repeatedly for long periods of time. In order to optimize the overall efficiency of the working machine and the life length of components in the working machine it is often desirable to find the most efficient manner of performing a specific work cycle.

In a working machine comprising a linkage and an implement connected to the linkage, components of the linkage are many times exposed to high loads leading to wear and tear of the components. If the working machine is operated in a non-optimal fashion, excessive wear and tear of the linkage may lead to a reduced life length of components in the linkage, thereby requiring more frequent servicing or reducing the overall life length of the linkage and other parts of the working machine. Accordingly, it is desirable to optimize operation of the working machine with respect to wear and tear of the linkage.

It is known to equip working machines with a plurality of sensors and to provide such sensor equipped working machines to customer sites for training purposes, where the wear and tear can be determined and reported to the operator. Thereby, operators can try the working machines at a test facility to learn how to operate the working machine efficiently and how to perform a specific work cycle in an optimized manner.

However, equipping each working machine with the required range of sensors is a very expensive process and there is also a risk that an operator does not operate the machine at the test facility in the same manner that the machine is usually operated under normal circumstances. Moreover, the training is also limited to the particular working machine, linkage and implement combination used, meaning that an operator potentially would need to train with several different working machines and linkages in order to learn how to efficiently operate different combinations of working machines, linkages and implements.

US2006/0243056 describes a working machine comprising a plurality of sensors to measure and estimate loads of the working machine during operation in order to construct a load history database for loads of the linkage used. The sensor network for determining loads described by US2006/0243056 comprises a plurality of different sensors such as hydraulic pressure sensors, cylinder position sensors, work implement position sensors, load pins and bending bridges for obtaining the required data for constructing the load history database.

However, due the above described complexity in equipping a working machine with all the required sensors, it is desirable to provide a simplified system and method for determining loads in a working machine.

SUMMARY

An object of the invention is to provide a method and a system for determining a load in a linkage of a working machine using a reduced number of sensors compared to what is used in known methods and systems.

According to a first aspect of the invention, there is provided a method for determining a load in a working machine comprising a linkage configured to be connected to an implement. The method comprises: determining at least one pressure in a first hydraulic cylinder and at least one pressure in a second hydraulic cylinder arranged to control the linkage and determining at least one link angle between at least two links in the linkage. The method further comprises, for a known linkage configuration and for a selected linkage bearing, for each of the first and second hydraulic cylinder, determining at least two perpendicular force components acting on the selected linkage bearing, based on the determined at least one pressure in each of the first and second cylinders and the at least one link angle; and determining a load on the selected linkage bearing as a linear combination of the determined at least two perpendicular force components using predetermined constants for the linear combination.

Thereby, by measuring the pressure in the cylinders and by knowing a linkage position based on the determined angle, the force contribution from each of the two cylinders is taken into account to determine a bearing load of a bearing in the linkage. Since the linkage configuration can be assumed to be known, the determined angle is sufficient to determine the respective force components acting on the bearing, resulting from the pressures of the two cylinders. The determined angle may for example be an angle between two links of the linkage or a lifting angle of the linkage. Moreover, determining loads of different bearings may require knowledge of different angles. It is also possible to determine the required number of angles of the linkage such that force component for all bearings of the linkage can be determined based on the measured angles, i.e. such that the position of all parts of the linkage is known based on the determined angles. The positions, i.e. the extension, of the hydraulic cylinders can also be estimated based on the determined angles. It is also possible to use position sensors or displacement sensors in the lift and tilt cylinders of the linkage and to derive the required angles of the linkage based on the positions of the hydraulic cylinders. It should be understood that the number of angles which must be determined to be able to determine a specific bearing load of a linkage depends on the specific linkage configuration for which the method is to be applied.

For hydraulic cylinders comprising two chambers, two pressures are determined in the respective first and second hydraulic cylinders. Such cylinders are referred to as double acting hydraulic cylinders, thereby requiring two pressure sensors. However, there are also types of hydraulic cylinders comprising only one chamber where it is sufficient to only determine one pressure, thereby requiring only one pressure sensor.

The predetermined constants for the linear combination are predetermined for a specific known linkage. Accordingly, the determined angle is used to transform the determined pressures into force components acting on the bearing described in a common coordinate system.

Hereby, a method is provided by which a bearing load can be determined based only on a determined linkage angle and determined pressures in hydraulic cylinders of the linkage, thereby reducing the number of sensors required for determining a bearing load. The load is determined as a linear combination of the force contributions from the two hydraulic cylinders, and more specifically from determined perpendicular force components in a common coordinate system. By means of the described method it is possible to determine a bearing load using a minimum number of sensors, meaning that the described method can be implemented in all operative working machines at a low cost, and not only in specific training machines. Thereby, it is possible to determine and monitor bearing loads under actual working conditions without using a complex sensing system comprising sensors such as calibrated strain gauges, load pins, half bridges or bending bridges. Moreover, nonlinearities in the structure due to e.g. nonlinear bushings, flexible elements and the like are taken into account by the described method.

According to one embodiment of the invention, the at least two perpendicular force components may advantageously be defined in the direction of two of the axis in a three-dimensional body fixed coordinate system. The use of a body fixed coordinate system may for example simplify comparisons with theoretically determined loads and stress. However, it should be noted that the method is applicable for an arbitrarily selected coordinate system.

According to one embodiment of the invention the working machine may be a wheel loader, wherein the first cylinder is a lift cylinder, and the second cylinder is a tilt cylinder of the wheel loader. A wheel loader is often used for the type of repetitive work tasks where it is important to perform the task efficiently to minimize wear and tear of the working machine, thereby increasing the life length of the linkage and associated components. Many commonly used linkages for wheel loaders comprise a lift cylinder for lifting the entire linkage and a tilt cylinder for tilting an implement connected to the linkage.

According to one embodiment of the invention, where the method is applied in a wheel loader comprising at least one steering cylinder, the method may further comprise determining at least one pressure in the at least one hydraulic steering cylinder; for the selected linkage bearing, determining two perpendicular force components acting on the bearing based on the at least one pressure in the at least one hydraulic steering cylinder, the at least one link angle and a steering angle; and determining a load of the bearing as a linear combination of the determined force components from the steering cylinder pressure, lift cylinder pressure and tilt cylinder pressure, using predetermined constants for the linear combination. The steering cylinders of the working machine may also contribute to the loads in a linkage, and in particular to the load in a bearing connecting an implement to the linkage, where a force from the steering cylinder translates into a force in the bearing. Thereby, additional load information can be derived by determining the pressure in the steering cylinders and determining the force contribution from the steering cylinders. In particular, the resulting force from a steering cylinder provides a force component in a different direction compared to the force components resulting from the lift and tilt cylinders. Moreover, even though the force resulting from a pressure in the steering cylinder primarily influences the load in a bearing connecting the linkage to an implement, it is also possible to take the steering cylinder contribution into account for other bearings and components in the linkage.

According to one embodiment of the invention, the method can be applied in an excavator comprising a motor for rotation of an excavator body. The method further comprises determining a torque provided by the motor; and for the selected bearing, determining a force component based on the torque provided by the motor and the at least one link angle; and determining a load of the bearing as a linear combination of the determined force components from the motor torque, lift cylinder pressure and tilt cylinder pressure, using predetermined constants for the linear combination. Hereby, the torque from the motor is translated into force components in a common coordinate system so that the load contribution can be accurately determined including the contribution from the motor acting to rotate the excavator body, and consequently the linkage and implement, in a similar manner as described above for the wheel loader. It should also be noted that an excavator may comprise additional cylinders not directly comparable to the lift and tilt cylinders of a wheel loader. However, the general principle of the described method is still applicable, namely to determine force contributions acting on bearings resulting from the determined pressure in the various hydraulic cylinders comprised in the linkage and to determine a bearing load based on the force contributions using linear relations.

According to one embodiment of the invention, the motor for rotation of an excavator body is a hydraulic machine, wherein the method further comprises: determining at least one pressure in the hydraulic machine; determining a force component based on the hydraulic machine pressure and the angle; and determining a load of the selected linkage bearing as a linear combination of the determined force components from the hydraulic machine pressure, first cylinder pressure and second cylinder pressure, using predetermined constants for the linear combination. Hereby, a hydraulic pressure sensor can be used to determine the pressure from a hydraulic motor of the excavator which in turn can be translated into force components acting of the selected bearing.

According to one embodiment of the invention, the load of the selected linkage bearing may be determined based on determined force components resulting from all hydraulic cylinders directly or indirectly acting on the linkage. As discussed above, a linkage for a working machine may comprise hydraulic cylinders in addition to the described lift and tilt cylinders and the described method may be applied to include pressures from all hydraulic cylinders acing on the linkage as long as the pressure from the hydraulic cylinders can be translated into force components to be used when determining the load using a linear combination.

According to one embodiment of the invention the method may further comprise determining a stress in a component, based on determined loads in the selected linkage bearing using a finite element method, FEM, analysis of the component. The component in which the stress is determined may for example be a part of the bearing or a link connected to the bearing. The FEM analysis result may be used in the vehicle for selected components or locations of a component. Moreover, stress tensors for the respective loads can be cumulatively multiplied with the loads to provide an accumulated measure of the stress in the component, thereby making it possible to predict a life consumption and remaining life of the component.

According to one embodiment of the invention the predetermined constants for the linear combination may advantageously be based on empirical data. Hereby, the constants describing the linear combination can be derived from an actual working machine having the same properties and comprising the same linkage and implement as the working machine in which the method is applied, thereby providing a model which can accurately describe a specific combination of working machine, linkage and implement. However, it is in principle also possible to determine the constants for the linear combinations analytically or through simulations.

According to one embodiment of the invention, the predetermined constants for the linear combination may advantageously be based on empirical data acquired from a test setup working machine comprising the selected linkage and being provided with a plurality of gauges not present in a conventional working machine. Thereby, the empirical data required to determine the constants describing the linear relation can be determined using a wide range of gauges and sensors. A conventional working machine should here be interpreted as a production working machine to be provided from a manufacturer to an end user. Moreover, the empirical data determined for one combination of linkage and implement may in practice be applicable also for other combinations where no empirical data is available, for example for a combination comprising a known linkage and an implement which is sufficiently similar to an implement for which the constants were determined. The empirical data may also be combined with analytical or simulated results to provide solutions for new linkage configurations and linkage/implement combinations.

According to one embodiment of the invention the test setup working machine may advantageously comprise at least one of each of an angle sensor, an accelerometer, a pressure sensor, a load pin and a strain gauge.

According to one embodiment of the invention, the method may further comprise adapting lubrication of the selected linkage bearing based on the determined load. Accordingly, the determined load for a given bearing can be provided to a lubrication control system. Hereby, the lubrication of a specific bearing can be adapted to the precise loads to which the bearing is exposed, thereby improving the lubrication efficiency.

There is also provided a computer program product comprising program code means for performing the steps of the method according to any one of the above embodiments when the program is run on a computer.

Moreover, there is provided a computer readable medium carrying a computer program product comprising program code means for performing above described method when the program product is run on a computer.

According to a second aspect of the invention, there is provided a system for determining a load in a working machine, the system comprising: a linkage of a working machine, the linkage being configured to be connected to an implement; a first hydraulic cylinder and a second hydraulic cylinder arranged to control the linkage; at least one pressure sensor arranged in each first and second hydraulic cylinder to determine a first pressure in the first hydraulic cylinder and a second pressure in the second hydraulic cylinder; and at least one angle sensor arranged to determine a link angle between at least two links of the linkage. The system further comprise a control unit configured to, for a known linkage configuration and for a selected linkage bearing, determine at least two perpendicular force components acting on the selected linkage bearing, based on the first and second pressure and the link angle; and determine a load on the bearing as a linear combination of the determined force components using predetermined constants for the linear combination. Hereby, a system is provided which can easily be implements in working machines to determine bearing loads using a minimum number of sensors, where known properties of the system are used to determine the loads.

Effects and features of this second aspect of the present invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the present detailed description, various embodiments of a method and system according to the present invention are mainly discussed with reference to a wheel loader comprising a linkage and a bucket. It should be noted that this by no means limits the scope of the present invention which is equally applicable to other types of linkages and implements as well as to other types of working machines such as excavators, backhoe loaders and similar types of working machines comprising hydraulic cylinders for operating part of the working machine.

Figure 1:
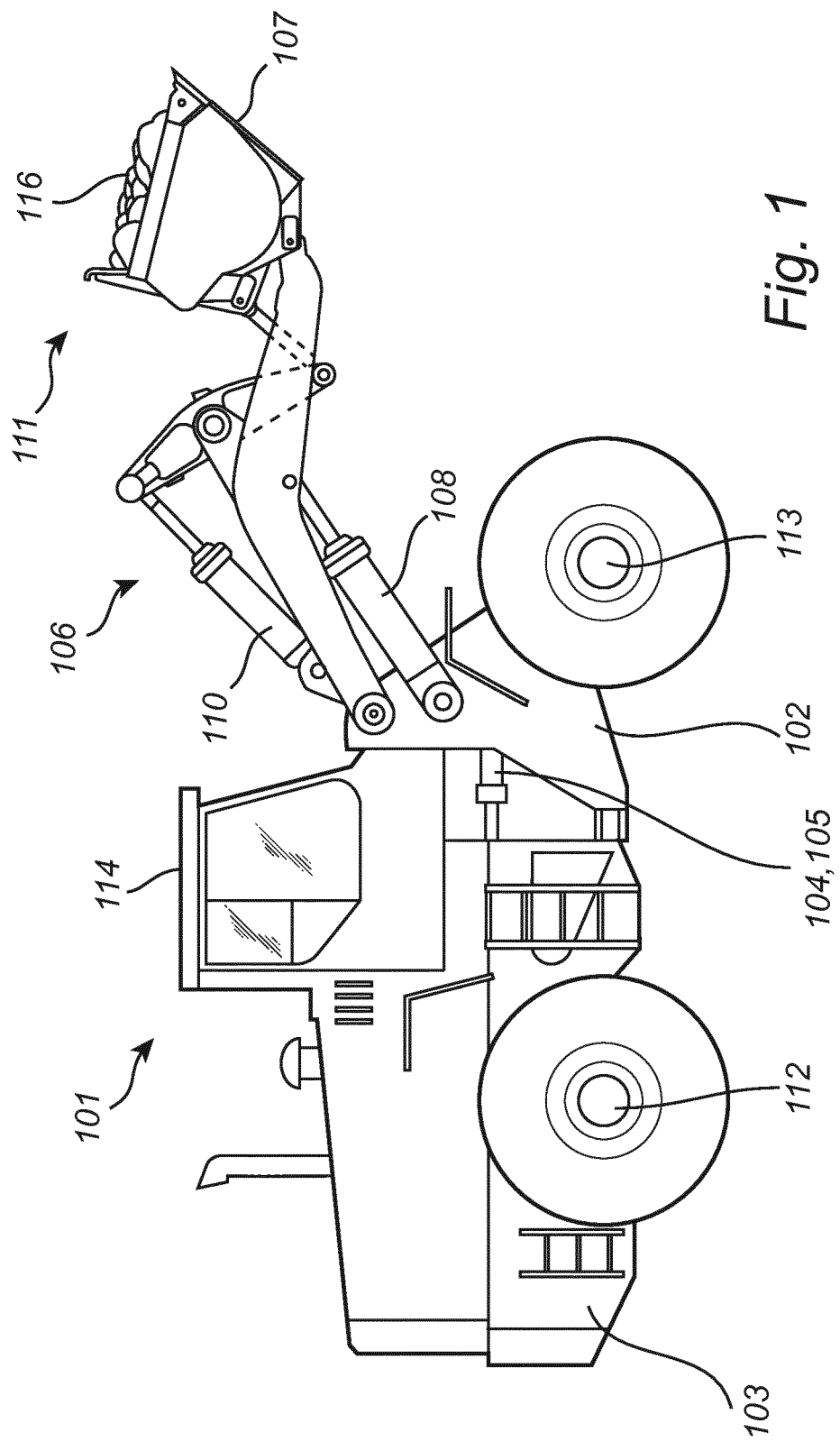
FIG. 1 is a wheel loader comprising a system according to an embodiment of the invention.
Figure 2:
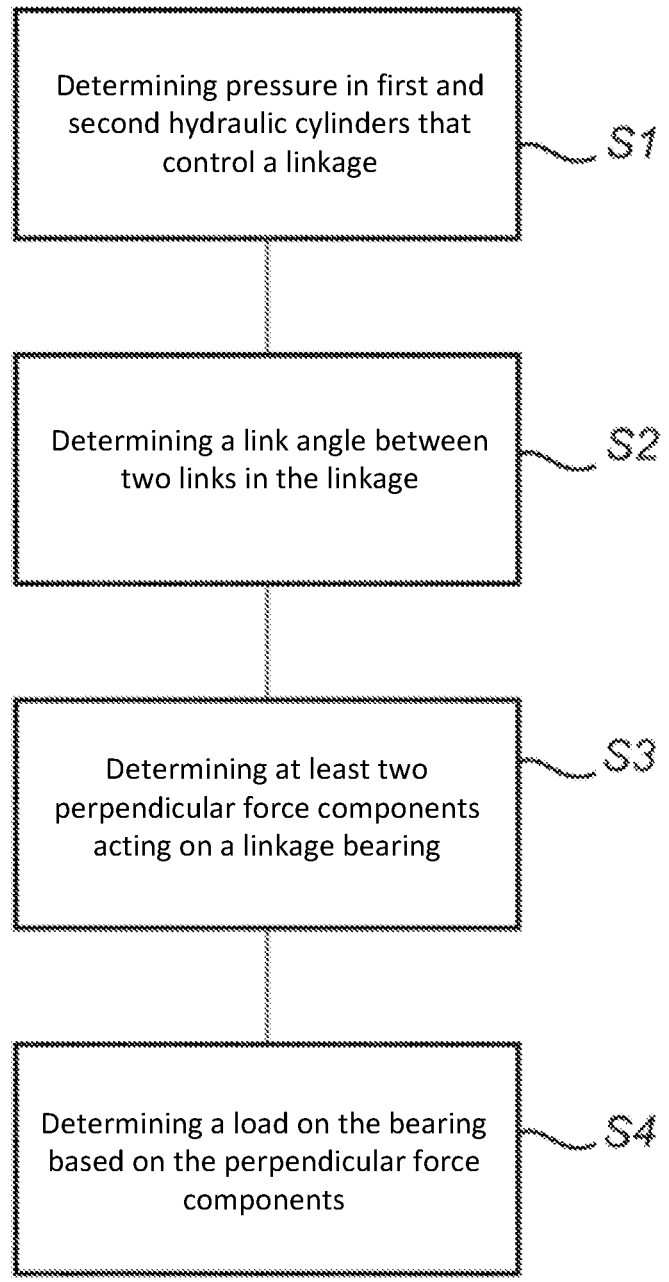
FIG. 2 is a flow chart outlining a method according to an embodiment of the invention.

FIG. 1 schematically illustrates a working machine 101 comprising a system for determining a load according to an embodiment of the invention. The working machine of FIG. 1 will be discussed with reference to FIG. 2 comprising a flow chart outlining the general steps of a method for determining a load in a working machine 101 according to an embodiment of the invention.

FIG. 1 shows a side view of a working machine in the form of a wheel loader 101. The wheel loader 101 comprises a front vehicle part 102 and a rear vehicle part 103, which parts each comprise a frame and a pair of drive axles 112, 113. The rear vehicle part 103 comprises a cab 114. The vehicle parts 102, 103 are coupled together with one another in such a way that they can be pivoted in relation to one another about a vertical axis by means of two hydraulic steering cylinders 104, 105 which are connected to the two parts 102, 103. The hydraulic steering cylinders 104, 105 are thus arranged on different sides of a center line in the longitudinal direction of the vehicle for steering, or turning the wheel loader 101.

The wheel loader 101 comprises an apparatus 111 for handling objects or material. The apparatus 111 comprises a linkage 106 and an implement 107 in the form of a bucket which is mounted on linkage 106. Here, the bucket 107 is filled with a material 116. A first end of the linkage 106 is coupled to the front vehicle part 102 for bringing about a lifting movement of the bucket 107. The bucket 107 is coupled to a second end of the linkage 106 for bringing about a tilting movement of the bucket 107

The linkage 106 can be raised and lowered in relation to the front part 102 of the vehicle by means of a hydraulic lift cylinder 108, which is coupled at one end to the front vehicle part 102 and at the other end to the linkage 106. The bucket 107 can be tilted in relation to the linkage 106 by means of a hydraulic tilt cylinder 110, which is coupled at one end to the linkage 106 and at the other end to the bucket 107 via a link arm system.

Figure 3:
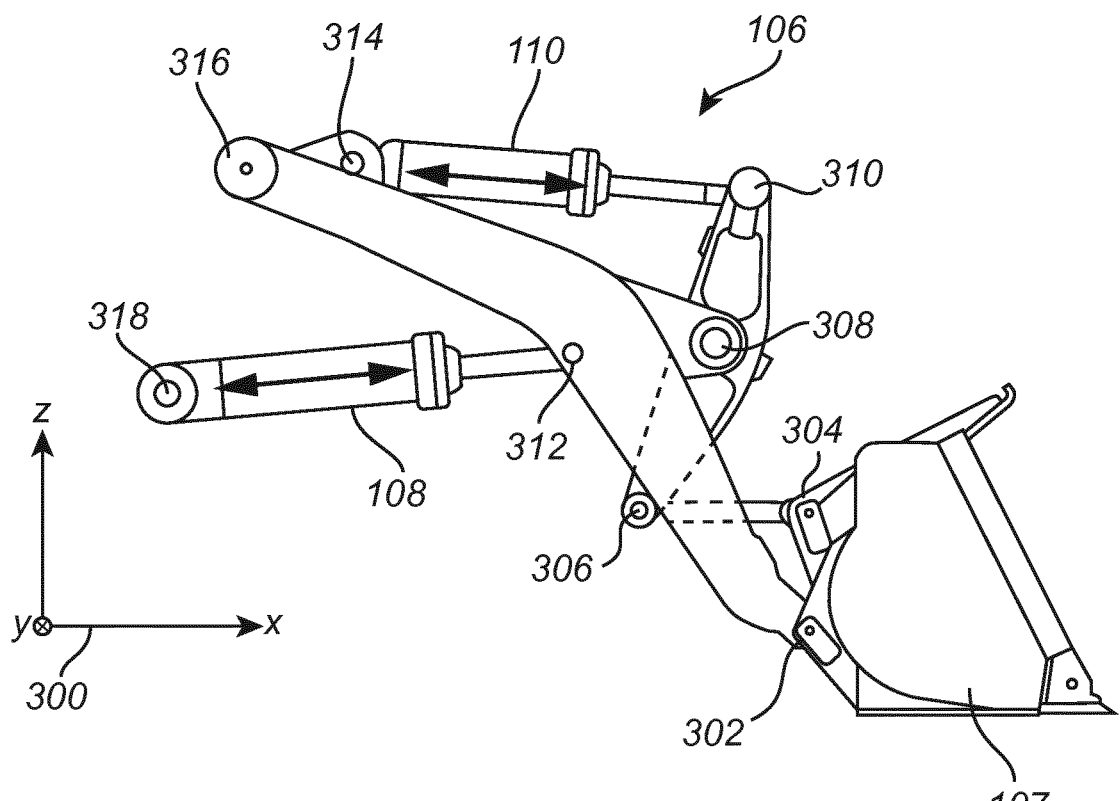
FIG. 3 is a linkage of a wheel loader comprising a system according to an embodiment of the invention.

FIG. 3 further illustrates a reference coordinate system 300 used to describe various embodiments of the present invention. In the reference coordinate system 300, the xy-plane defines the horizontal plane of the vehicle where the x-axis extends along the length direction of the vehicle and the y-axis is perpendicular to the length direction of the vehicle in the horizontal plane. The z-axis defines the vertical direction, thereby forming a three-dimensional coordinate system with perpendicular axes. In a body fixed coordinate system, the coordinate system is defined with respect to the specific component for which a load is to be determined as will be illustrated in the following.

The system for determining a load further comprises a control unit (not shown) configured to perform the steps of the method according to various embodiment of the invention. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The control unit is connected to the various described features of the working machine and is configured to control system parameters. Moreover, the control unit may be embodied by one or more control units, where each control unit may be either a general purpose control unit or a dedicated control unit for performing a specific function.

Accordingly, the control unit is configured to control the system to perform the steps of a method for determining a load in a working machine 101.

The method for determining a load in a working machine 101 comprises the steps of determining S1 at least one pressure in a first hydraulic cylinder 108, here represented by the hydraulic lift cylinder 108, and at least one pressure in a second hydraulic cylinder 110, here represented by the hydraulic tilt cylinder 110. The hydraulic lift cylinder 108 and the hydraulic tilt cylinder 110 are arranged to control the linkage and the implement 107 as described above. For hydraulic cylinders comprising two chambers, a positive pressure acting in the opposing longitudinal directions of the hydraulic cylinders is determined as illustrated by the arrows of the lift cylinder 108 and the tilt cylinder 110 in FIG. 3. In case of a hydraulic cylinder comprising two chambers, separate sensors are used for measuring the pressure on the piston and the piston rod side.

Next, at least one link angle between at least two links in the linkage is determined S2. For the linkage 106 illustrated in FIG. 3, it is sufficient to know the angle at one of the bearings 302, 304 connecting the linkage 106 to the bucket 107, and the angle of the bearing 316 connecting the linkage 106 to the front vehicle part 102 to know the position of all of the components in the linkage 106. It may also be desirable to measure the angle of the articulated bearing connecting the front vehicle part 102 to the rear vehicle part 103. The information about the angle of the articulated bearing is used to translate a steering force into the coordinate system of the selected linkage bearing. For a selected linkage bearing in which a load is to be determined, and for each of the first and second hydraulic cylinder 108, 110, at least two perpendicular force components acting on the bearing are determined S3 based on the determined at least one pressure in the first and second hydraulic cylinders 108, 110 and on the link angle. Finally, a load on the bearing is determined S4 as a linear combination of the determined at least two perpendicular force components from each of the first and second hydraulic cylinder 108, 110 using predetermined constants for the linear combination.

Figure 4:
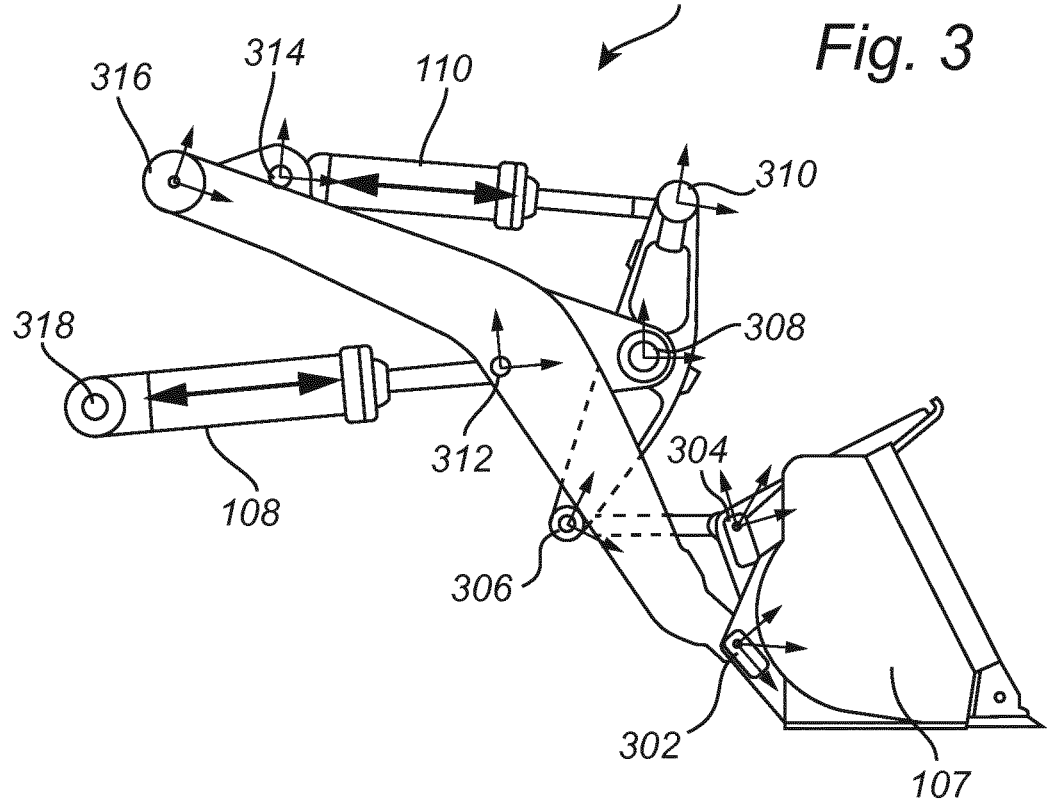
FIG. 4 is a linkage of a wheel loader comprising a system according to an embodiment of the invention.

FIG. 4 schematically illustrates the linkage 106 of FIG. 1 in further detail. The linkage comprises a plurality of bearings 302, 304, 306, 308, 310, 312, 314, 316, 318 connecting the links of the linkage to each other, to the implement and to the lift and tilt hydraulic cylinders 108, 110. FIG. 3 further illustrates the linkage 106 with body fixed coordinate systems for various components, with the origin of the coordinate system here defined as the center of the bearing. In the body fixed coordinate system, the coordinate system is aligned with the component, i.e. the body, for which a load is to be determined. The coordinate system may for example have one axis in the longitudinal direction of a link connected to a bearing.

In an example description relating to the bearing 302 connecting the linkage to the implement, the loads on the bearing 302 in the X-, Y- and Z-directions can be determined as:

Load $Y = C_{1y} \times F_{LX} + C_{2y} \times F_{LZ} + C_{3y} \times F_{TX} + C_{4y} \times F_{TZ} + C_{5y} \times F_{S1X} + C_{6y} \times F_{S1Y} + C_{7y} \times F_{S2X} + C_{8y} \times F_{S2Y}$ Load $X = C_{1x} \times F_{LX} + C_{2x} \times F_{LZ} + C_{3x} \times F_{TX} + C_{4x} \times F_{TZ}$ Load $Z = C_{1z} \times F_{LX} + C_{2z} \times F_{LZ} + C_{3z} \times F_{TX} + C_{4z} \times F_{TZ}$ In the above relations, Load Y, Load X and Load Z describe the bearing load in the Y-X and Z-directions, respectively. $C_{1x}$ to $C_{4x}$ are constants of the linear relation describing the loads in the x-direction, $C_{1y}$ to $C_{8y}$ are constants of the linear relation describing the loads in the y direction and $C_{1z}$ to $C_{4z}$ are constants of the linear relation describing the loads in the Z-direction. The force components in x-, y- and z-directions are represented by $F_{XYZ}$, where the notation L, as in $F_L$, represents a force component from the lift cylinder 108, the notation T, as in $F_T$, corresponds to a force component from the tilt cylinder 110 and S1, S2 represent force components from the first and second steering cylinder 104, 105, respectively. The magnitude of each force component is determined based on the determined angle and pressures. It should be noted that the values of the different constants depends on factors such as linkage geometries and types of linkages. The described constants are for example determined in a controlled environment with a plurality of sensors mounted on a test machines.

The constants may also depend on the type of material which is handled by the working machine. Thereby, a working machine may be provided with a range of different sets of constants for example for different implement and for handling different materials. The specific set of constants to be used can then be selected by an operator of the working machine or automatically based on a connected implement so as to ensure that the correct linear relations are used for the current configuration and operating condition of the working machine.

For some of the bearings and for some operating conditions, the force component in the y-direction can be considered to be negligible and thereby excluded from the calculation. The force component in the y-direction can for example be neglected if the pressure of the steering cylinders 104, 105 is low or zero.

Figure 5:
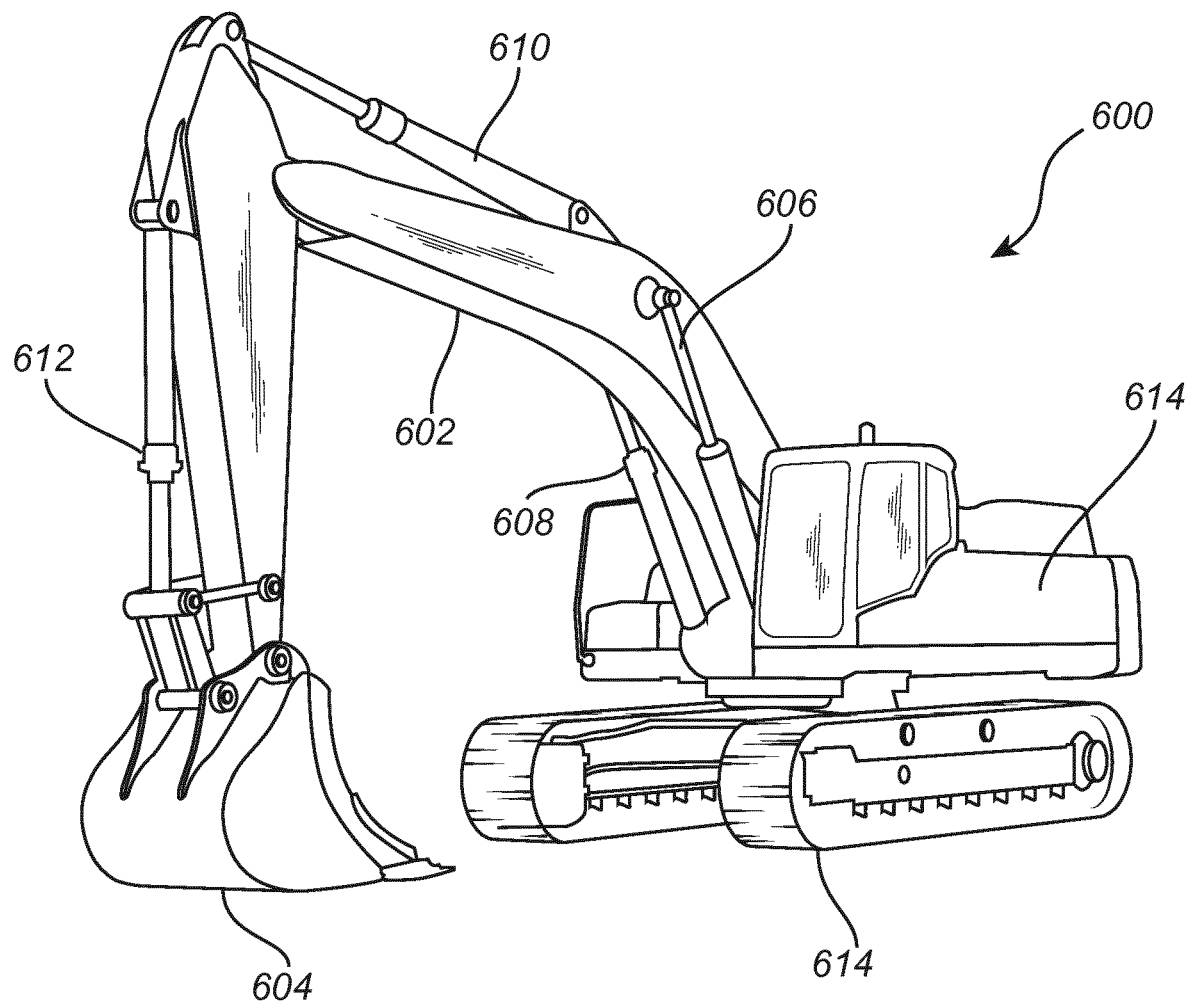
FIG. 5 is an excavator comprising a system according to an embodiment of the invention.

FIG. 5 schematically illustrates an excavator 600 comprising a linkage 602 and a bucket 604 attached to the linkage 602. The excavator comprises a plurality of hydraulic cylinders 606, 608, 610 and 612 for controlling the linkage. In the illustrated example, the linkage 602 of the excavator 600 comprises two boom cylinders 606, 608, and arm cylinder 610 and a bucket cylinder 612. An excavator linkage 602 typically comprises an additional degree of freedom in comparison with the linkage 106 of the wheel loader. Moreover, the excavator 600 comprises an upper frame 614 which is rotatable in relation to the undercarriage 616 of the excavator 600. The upper frame 614 is rotatable by means of a motor, such as a hydraulic motor.

Bearing loads of the excavator linkage 602 can be determined in the same manner as described above for the wheel loader 101 and will therefore not be discussed in further detail. In comparison to the wheel loader 101, the motor for rotating the house 614 can be seen as equivalent to the steering cylinders 104, 105 of the working machine in that they provide force components in the y-direction. Accordingly, when determining a bearing load in the excavator linkage 602, the force components from the motor are taken into account.

The determined loads can be used to instruct and/or train the operator in using the working machine in the most efficient manner. The determined loads can for example provide an indication of an optimal angle of attack for loading the bucket where the loads of the linkage are as low as possible. Other actions and situation which can be optimized include: the position of the lifting framework when carrying a load, the position of the tilt cylinder and lift cylinder while filling the bucket and how to fill the bucket in different. Even if an operator is familiar with the type of working machine used, the optimal operating procedure may differ depending on parameters such as the type of material which is handled, such as gravel, rock, dense materials etc. Moreover, a load indication available to the operator of the vehicle can be used to determine a preferred speed during different loading cycles and also to determine and warn for certain positions which the working machine should avoid while doing some operations. Accordingly, all of the above examples can be performed in real time in the working machine by means of the described method and system.

It is to be understood that the present invention is not limited to the embodiments described above and illustrated in the drawings; rather, the skilled person will recognize that many changes and modifications may be made within the scope of the appended claims.

The invention claimed is:

1. A method for determining a load in a working machine comprising a linkage configured to be connected to an implement, the method comprising:
   determining at least one pressure in a first hydraulic cylinder and at least one pressure in a second hydraulic cylinder arranged to control said linkage;
   determining at least one link angle between at least two links in the linkage;
   for a known linkage configuration, for a selected linkage bearing, and for each of said first and second hydraulic cylinder, determining at least two perpendicular force components acting on said bearing, based on said determined at least one pressure in said first and second cylinders respectively and said at least one link angle; and
   determining a load on said bearing as a linear combination of said determined at least two perpendicular force components from each of said first and second hydraulic cylinder using predetermined constants for the linear combination;
   wherein said working machine is a wheel loader, and wherein the first cylinder is a lift cylinder, and said second cylinder is a tilt cylinder of said wheel loader;
   wherein said wheel loader comprising at least one steering cylinder, and said method further comprises:
   determining at least one pressure in said at least one hydraulic steering cylinder;
   for said selected linkage bearing, determining two perpendicular force components based on said at least one pressure in said at least one hydraulic steering cylinder, said at least one link angle and a steering angle; and
   determining a load of said selected linkage bearing as a linear combination of said determined force components from said steering cylinder pressure, lift cylinder pressure and tilt cylinder pressure, using predetermined constants for the linear combination.

2. The method according to claim 1, wherein said at least two perpendicular force components are defined in the direction of two of the axis in a three-dimensional body fixed coordinate system.

3. The method according to claim 1, wherein said load of said selected linkage bearing is determined based on determined force components resulting from all hydraulic cylinders directly or indirectly acting on said linkage.

4. The method according to claim 1, further comprising, determining a stress in a component, based on determined loads in said selected linkage bearing using a finite element method, FEM, analysis of said component.

5. The method according to claim 1, wherein the predetermined constants for the linear combination are based on empirical data.

6. The method according to claim 1, wherein said test setup working machine further comprises at least one of each of an angle sensor, an accelerometer, a pressure sensor, a load pin and a strain gauge.

7. The method according to claim 1, further comprising adapting lubrication of said selected linkage bearing based on said determined load.

8. A computer program product comprising:
   a non-transitory computer readable storage medium having computer readable program instructions stored thereon, said computer readable program instructions being configured to perform the operations of claim 1 when said computer readable program instructions are run on a computer.

9. A method for determining a load in a working machine comprising a linkage configured to be connected to an implement, the method comprising:
- determining at least one pressure in a first hydraulic cylinder and at least one pressure in a second hydraulic cylinder arranged to control said linkage;
- determining at least one link angle between at least two links in the linkage;
- for a known linkage configuration, for a selected linkage bearing, and for each of said first and second hydraulic cylinder, determining at least two perpendicular force components acting on said bearing, based on said determined at least one pressure in said first and second cylinders respectively and said at least one link angle; and
- determining a load on said bearing as a linear combination of said determined at least two perpendicular force components from each of said first and second hydraulic cylinder using predetermined constants for the linear combination;
- wherein said working machine is an excavator comprising a motor for rotation of an excavator body, the method further comprising:
- determining a torque provided by said motor; and
- for the selected linkage bearing, determining a force component based on said torque provided by said motor and said at least one link angle; and
- determining a load of said selected linkage bearing as a linear combination of said determined force components from said motor torque, lift cylinder pressure and tilt cylinder pressure, using predetermined constants for the linear combination.

10. The method according to claim 9, wherein said motor for rotation of an excavator body is a hydraulic machine, said method further comprising:
- determining at least one pressure in said hydraulic machine;
- determining a force component based on said hydraulic machine pressure and said angle; and
- determining a load of the selected linkage bearing as a linear combination of said determined force components from said hydraulic machine pressure, first cylinder pressure and second cylinder pressure, using predetermined constants for the linear combination.

11. The method according to claim 9, wherein said selected linkage bearing is a bearing connecting said linkage to an implement.

12. A system for determining a load in a working machine, the system comprising:
- a linkage of a working machine, the linkage being configured to be connected to an implement;
- a first hydraulic cylinder and a second hydraulic cylinder arranged to control the linkage;
- at least one pressure sensor arranged in each first and second hydraulic cylinder to determine a first pressure in the first hydraulic cylinder and a second pressure in the second hydraulic cylinder; and
- at least one angle sensor arranged to determine a link angle between at least two links of the linkage;
- the system further comprising a control unit configured to, for a known linkage configuration and for a selected linkage bearing, determine at least two perpendicular force components acting on said selected linkage bearing, based on said first and second pressure and said link angle; and
- determine a load on said bearing as a linear combination of said determined force components using predetermined constants for the linear combination;
- wherein said working machine is a wheel loader, and wherein the first cylinder is a lift cylinder, and said second cylinder is a tilt cylinder of said wheel loader;
- wherein said wheel loader comprises at least one steering cylinder, and the control unit is further configured to:
- determine at least one pressure in said at least one hydraulic steering cylinder;
- for said selected linkage bearing, determine two perpendicular force components based on said at least one pressure in said at least one hydraulic steering cylinder, said at least one link angle and a steering angle; and
- determine a load of said selected linkage bearing as a linear combination of said determined force components from said steering cylinder pressure, lift cylinder pressure and tilt cylinder pressure, using predetermined constants for the linear combination.

13. The system according to claim 12, wherein said vehicle is a wheel loader, said first cylinder is a lift cylinder, and said second cylinder is a tilt cylinder.

14. The system according to claim 13, further comprising a steering cylinder of the vehicle and a pressure sensor arranged to determine a pressure of said steering cylinder.

15. The system according to claim 12, wherein the vehicle is an excavator comprising a hydraulic machine for rotating an upper frame of said excavator and a pressure sensor arranged to determine a pressure of said hydraulic machine.

16. A vehicle comprising the system according to claim 12.

* * * * *